US010884390B2

(12) United States Patent
Bretschneider et al.

(10) Patent No.: US 10,884,390 B2
(45) Date of Patent: Jan. 5, 2021

(54) OPTIMIZED CONTROL OF A METAL-CUTTING MACHINE TOOL

(71) Applicant: Siemens Aktiengesellschaft, Munich (DE)

(72) Inventors: Jochen Bretschneider, Esslingen (DE); Thomas Pitz, Weil der Stadt (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 618 days.

(21) Appl. No.: 14/732,202

(22) Filed: Jun. 5, 2015

(65) Prior Publication Data

US 2015/0355622 A1 Dec. 10, 2015

(30) Foreign Application Priority Data

Jun. 6, 2014 (EP) .................................... 14171557

(51) Int. Cl.
*G05B 19/18* (2006.01)
*G05B 19/41* (2006.01)

(52) U.S. Cl.
CPC ........... *G05B 19/182* (2013.01); *G05B 19/41* (2013.01); *G05B 2219/35097* (2013.01); *G05B 2219/36252* (2013.01); *G05B 2219/37087* (2013.01); *G05B 2219/42207* (2013.01)

(58) Field of Classification Search
None
See application file for complete search history.

(56) References Cited

U.S. PATENT DOCUMENTS 3,619,581 A * 11/1971 Kimura .................. B24B 17/10 318/570
5,923,561 A * 7/1999 Higasayama ...... G05B 19/4097 700/186
7,570,006 B2 8/2009 Bretschneider
7,988,606 B2 8/2011 Bretschneider et al.
8,322,698 B2 12/2012 Bretschneider
2007/0046677 A1* 3/2007 Hong .................... G05B 19/41 345/442
2009/0102410 A1 4/2009 Bretschneider et al.
2009/0164038 A1 6/2009 Bretschneider et al.
2009/0222306 A1 9/2009 Bretschneider et al.
2010/0138018 A1 6/2010 Bretschneider et al.
2011/0316335 A1 12/2011 Bretschneider et al.

FOREIGN PATENT DOCUMENTS

DE 10343785 A1 * 4/2005 ............ G05B 19/41
GB 2423592 A 8/2006
GB 2423592 B * 2/2010 ......... G05B 19/4069

* cited by examiner

*Primary Examiner* — Rocio Del Mar Perez-Velez
*Assistant Examiner* — Hung H Dang
(74) *Attorney, Agent, or Firm* — Henry M. Feiereisen LLC

(57) ABSTRACT

Milling errors are to be prevented by repairing in particular NC parts programs by evaluating spatial information for smoothing a cutting or milling path section instead of evaluating only information along an individual cutting or milling path section. Relationships between adjacent cutting or milling path sections are thus taken into consideration in a smoothing process.

8 Claims, 5 Drawing Sheets

OPTIMIZED CONTROL OF A METAL-CUTTING MACHINE TOOL

CROSS-REFERENCES TO RELATED APPLICATIONS

This application claims the priority of European Patent Application, Serial No. EP 14171557.3, filed Jun. 6, 2014, pursuant to 35 U.S.C. 119(a)-(d), the content of which is incorporated herein by reference in its entirety as if fully set forth herein.

BACKGROUND OF THE INVENTION

The present invention relates to a method for controlling a metal-cutting machine tool by providing a parts program for controlling the metal-cutting machine tool, wherein the parts program describes a number of cutting path sections running next to one another for producing a 3D contour, wherein each cutting path section consists of a sequence of path elements, namely support points and line elements, and each line element connects a pair of support points to one another, as well as the optimization of a course of the path and controlling the cutting machine in accordance with the optimized path. In addition the present invention relates to a corresponding control facility for controlling a metal-cutting machine tool.

The following discussion of related art is provided to assist the reader in understanding the advantages of the invention, and is not to be construed as an admission that this related art is prior art to this invention.

The metal-cutting machine tools are mostly referred to as milling machines, but may also include lathes. A line element is to be understood here as a straight line, an element of a circle or a higher-order geometrical element (for example a spline), or a combination thereof.

In free-form surface processing (e.g. in tool making and die making), NC parts programs are used as a rule to control the respective machine, especially milling machine. NC parts programs (also called parts programs) are nowadays generated primarily by CAD/CAM/PP system. In such cases the element or object to be manufactured is initially designed with a CAD (Computer Aided Design) program and subsequently translated by a CAM (Computer Aided Manufacturing) program into a machine-independent code (describes the processing sequence). A Post-Processor (PP) translates the machine-independent code into a machine-dependent code, the NC parts program, which can be used for activating the actual machine in each case. In such cases the processing is divided into different steps, such as roughing, pre-finishing and finishing.

At the latest in the finishing process, the surfaces to be processed or manufactured are divided into substantially uniformly spaced processing paths, which describe the surface contour of the workpiece, with the paths then being followed, for example in a metal-cutting process, by a milling machine. Such a processing path (abbreviated below as path) is a path that consists of support points which are connected in pairs by line elements (referred to below also as linear sets).

Such a program, or its graphic visualization, is reproduced in sections in FIG. 1. A surface contour is to be created here with numerous cutting paths 1 running next to one another (i.e. cutting path sections at approximately the same distance from one another). Each of the cutting paths consists of a number of support points 2 and a number of linear sections 3. A line element or a linear set is located between two adjacent support points 2 which connects these two support points 2.

During the process of producing the path deviations 4, 5 occasionally occur as part of the predefined computing tolerance (cf. FIG. 6) if support points are unintentionally left out by the CAM system or are disposed offset from one another. However deviations 6 (cf. FIG. 3) can also occur when there are too many support points present.

The NC parts program produced in the CAD/CAM/PP system is usually copied to a machine with a numerical control (NC) and subsequently run by a machine operator on machine with the aid of the numerical control. In such cases a numerical control considers each cutting path section individually with a certain time and distance horizon into the future (Look-Ahead) and does not evaluate hard deviations in cutting path sections lying next to one another. The cutting tip or ball center in a ball cutter moves here along the respective cutting path sections. Cutting path sections lying next to one another (parallel paths) are often processed directly after one another, depending on the cutting strategy.

To generate an NC parts program which describes the entire cutting path which is to be followed by the cutter there is generally a surface or body description available to the CAM system from the CAD system through higher-order functions. Such a higher-order function 7 is linearized by the CAM system in the cutting direction, i.e. approximated by linear sets or linear sections 8. Each linear section connects two adjacent support points, e.g. P1 and P2 or P2 and P3. Each of the support points P1, P2 and P3 lies for example on the edge of a tolerance band 9, which is depicted in FIG. 2 by dotted-line edges. Accordingly at each point a location-dependent chord error 10 is produced. The chord thus represents the distance between the linearized cutting path section 1 and the ideal function 7 and must be below a predefined tolerance value. The linearization thus causes the surface accuracy to deteriorate.

The cutting machine for its part is provided with the parts program, i.e. the cutting path sections 1, and is expected to "guess" the ideal function 7 therefrom. Spline algorithms can be used for this purpose for example, which round up the linearized cutting path sections. This may possibly lead to further artifacts (cf. FIGS. 3 and 4).

The predefined tolerance value for the chord error in the CAM system and the algorithms for linearization in the CAM system have a direct influence on the distribution of the support points. In industrial practice however a plurality of CAM systems with different characteristics are in use.

To improve the surface quality the tolerance can be reduced in the CAM system (the tolerance band 9 narrowed) and the options of the CAM for homogenizing the point distribution can be used in the parts program. The problem with this is that the operators of the CAM are trained differently and the quality of the programs depends greatly on the degree of experience of the user.

On the NC controller side there is currently only the option of smoothing the paths in the cutting direction (one-dimensional). In such cases the smoothing works differently depending on the support points available and also their distribution. This can lead to problems, which are shown in the examples of FIG. 3 and FIG. 4. The NC program describes the creation for example of an edge 11, which is to be embodied successively by the individual cutting path sections 1. In most cutting path sections 1 no further support points are produced here in the vicinity of the cutting edge 11. On one of the cutting path sections in the area of the deviation 6, for reasons of rounding, tolerance etc., occasionally further support points 21, 22 are embodied in the vicinity of the edge 11. The edge 11 is thus described on this cutting path section by three points 21, 22 and 23. The NC control can react completely differently to this than to a cutting path section on which the edge is only described by a single support point 2.

A possible reaction of an actual NC control or cutting machine is reproduced in FIG. 4. The cutting edge 11 is ground the same everywhere but that cutting path section which is described by the three support points 21, 22 and 23 lying together lies significantly higher than all other cutting path sections. This produces a marked disruption on the surface to be processed.

Similar effects are produced with a curved surface if a cutting path section has a support point in a certain area and does not have one in the adjacent area or areas. Through the smoothing the cutting tool then follows a different "serpentine line" on each path section. This leads to a marked formation of grooves on the surface.

One of the ways in which the problems of surface quality have long been solved is that programs of higher quality have been created in CAM or the NC control has a low smoothing tolerance specified to it, within which corners and edges are adhered to as precisely as possible in accordance with the specifications. This means that such surface errors are less visible. However this results in the formation of sharp edges over which the machine must travel, with the undesired effect of lower speeds.

A further option for solving this problem is post processing of the finished workpiece "manually". In this case the individual cutting errors are rectified manually after the workpiece has been finished, which requires more time and thus more money in the manufacturing process.

There is naturally also the option of generating new NC parts programs in CAD/CAM with slightly change parameters, which in turn can lead to new different errors. However this type of global repair naturally also costs time.

It would therefore be desirable and advantageous to obviate prior art shortcomings and to improve the surface quality during processing with automated, metal-cutting machine tools.

SUMMARY OF THE INVENTION

According to one aspect of the invention, a method for controlling a metal-cutting machine tool with a parts program includes describing with the parts program a path composed of a plurality of adjacent cutting path sections representing a 3D contour, wherein each cutting path section includes a series of path elements composed of support points and line elements connecting respective pairs of the support points; defining a tolerance value; analyzing at least a part of a first of the cutting path sections as to whether the defined tolerance value is satisfied in relation to at least one path element of at least one second cutting path section adjacent to the first cutting path section; separately examining a plurality or each of the support points of the first cutting path section by taking into account all support points located in a predefined spatial region around the support point to be examined; optimizing a course of the path by modifying, adding to or removing from the first cutting path section at least one path element so that the defined tolerance value is satisfied; and controlling the metal-cutting machine in accordance with the optimized course of the path.

According to another aspect of the invention, a control facility for controlling a metal-cutting machine tool includes a storage device storing a parts program for controlling the metal-cutting machine tool, wherein the parts program describes a path composed of a plurality of adjacent cutting path sections representing a 3D contour; with each cutting path section comprising a series of path elements composed of support points and line elements connecting respective pairs of the support points, a computing device configured to optimize a course of the path by analyzing at least a part of a first of the cutting path sections as to whether a defined tolerance value is satisfied in relation to at least one path element of at least one second cutting path section adjacent to the first cutting path section, to separately examine a plurality or each of the support points of the first cutting path section by taking into account all support points located in a predefined spatial region around the support point to be examined, and to optimize a course of the path by modifying, adding to or removing from the first cutting path section at least one path element so that the defined tolerance value is satisfied. The control facility furthermore includes an activation device configured to control the metal-cutting machine tool in accordance with the optimized course of the path.

The metal-cutting machine tool may involve a milling machine (under some circumstances also a lathe) and the processing path may involve a cutting path.

According to one advantageous feature of the present invention, a cutting path section may thus (also) be analyzed in respect of one or more path elements of one or more adjacent cutting path sections, if necessary also cutting path sections from the immediate vicinity. The path is then optimized by support points and thus also line elements having their position changed, being removed or being added in accordance with the analysis result. A cutting path section (general: processing path section) is thus optimized by one or more components of one or more adjacent cutting path sections being included in the calculation (preferably the segments of adjacent cutting path sections which are located in the vicinity of the path section (to be optimized). Thus an improvement of the surface of a workpiece which has resulted from a defectively generated NC parts program is possible with the invention. Like the so-called "smart repair methods" in the automotive sector, defect points are hereby identified and subsequently repaired locally. In particular it is possible using this method for an NC control no longer to consider each path section individually and thus be able to more easily recognize deviations in parallel path sections. The computing algorithm for reducing surface errors or smoothing may in such cases relate to a distance or angle from the first of the second cutting path section, i.e. between the cutting path sections. In particular it may relate to a distance or angle of geometrical objects such as points, straight lines through two points or surfaces through three points defined by points on at least one but not exclusively one path section of another cutting path. In this way it may be established that an error is present in the parts program when the distance between two cutting path sections or line elements or the angle therebetween is too large or the support point distribution on the respective path section is too coarse.

According to another advantageous feature of the present invention, the condition may be satisfied for each cutting path section during optimization in that the distance between two adjacent support points on a cutting path section or on adjacent cutting path sections is smaller than a predefined first maximum distance value. This means that, not only along a cutting path section but also transverse thereto, it is examined whether a predefined support point grid is being satisfied. If adjacent support points are spaced too far apart, then an additional support point may be inserted automatically or, in a predefined radius of the point considered, the path courses of the path sections may be taken into account. In such cases a maximum distance for each spatial direction may be predefined individually, and in particular the respective maximum distances may differ from one another.

The optimization step may advantageously be repeated until the predefined minimum distance value is smaller than the first minimum distance value. This means that with different grid spacing successive attempts may be made to build additional support points into a parts program.

In accordance with the invention, several or each of the support points of the first cutting path section are analyzed separately during the analysis, wherein in each case all support points in a predefined spatial area around the support point to be examined or also intersection points of an edge of the spatial area with path sections are considered. This means that, for the creation of an optimized parts program, not only are the points on one cutting path section examined, but all support points in a spatial area around a support point and/or intersection points of the cutting path with the edge of the spatial area. If then for example a tolerance value is not adhered to (e.g. distance or angle in relation to another path element or in relation to a surface or the like is too large or too small) then the position of the examined support point is modified, the point is removed or a new support point is added into the spatial areas.

The predefined spatial area may be a sphere with its central point at the support point to be examined. The spatial area may naturally also be formed by another geometrical body, e.g. cube, cylinder and the like.

If necessary, in an actual spatial area around the support point to be examined, a support point is automatically inserted before the analysis on at least one line element located in the actual spatial area, when the number of support points in the actual spatial area is less than a predefined numerical value, when a predefined distribution is not adhered to or when a maximum distance between support points is exceeded. An additional support point can then be integrated on a cutting path section on the basis of neighborhood information, i.e. information about the course of one or more adjacent cutting path sections, which would then allow smoothing of a surface.

Additional geometrical information that is independent of the path elements may be used in the optimization of the path for reduction of surface errors. For example, the additional information may involve an edge, a corner or another geometrical path or another geometrical body (e.g. sphere, cylinder etc.). Such additional information allows an additional optimization of the position of the support points.

Analyzing and optimizing may take place at least to some extent during the control of the milling machine. Optimizing the parts program for grinding or smoothing the surface may thus be carried out during the program sequence, if allowed by the NC control. Analyzing and optimizing may, however, also be performed beforehand for example on a PC.

The method steps presented in detail above apply, mutatis mutandis, as mutually independent functions also to the control facility according to the invention.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
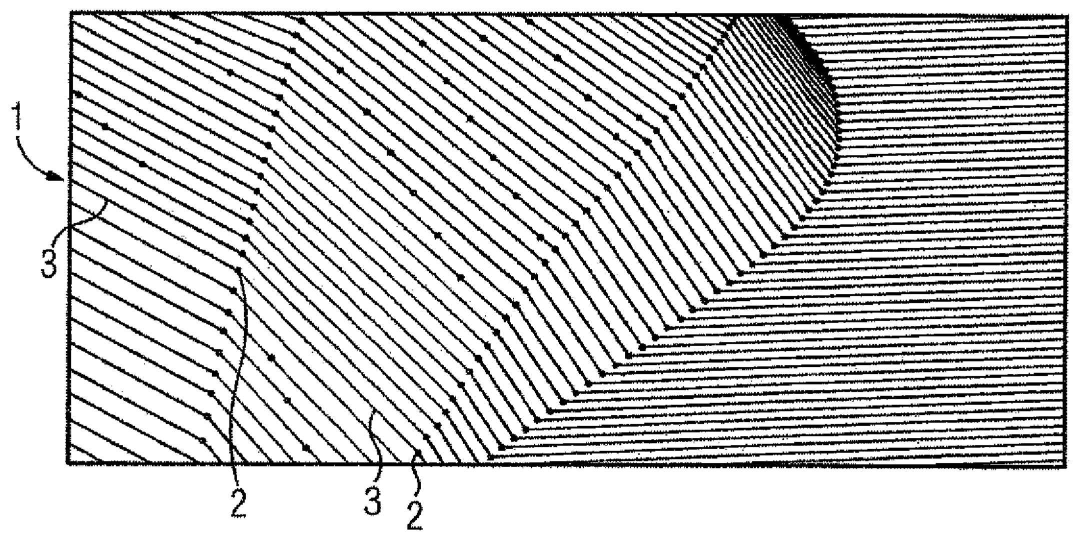
FIG. 1 shows a schematic diagram of an NC parts program in accordance with the prior art.

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Figure 5:
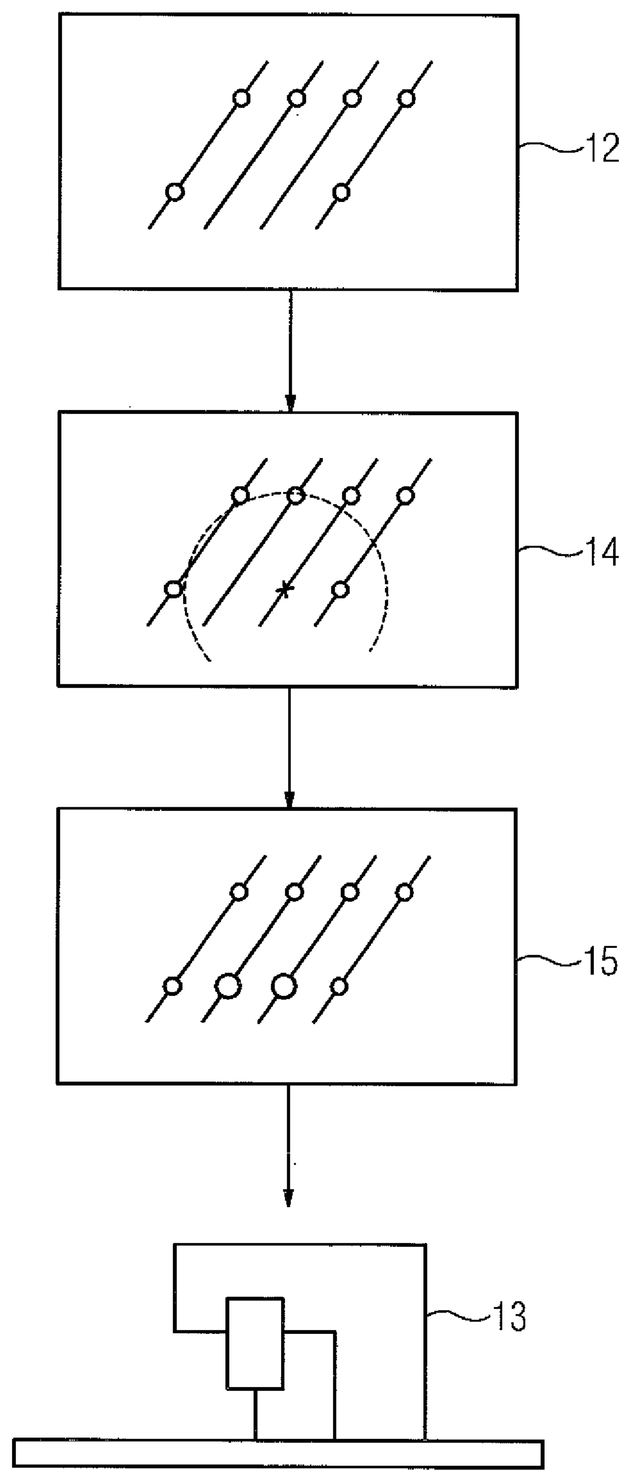
FIG. 5 shows a flow diagram of the method according to the present invention (integrated into a CNC as a computing algorithm)

Turning now to the drawing, and in particular to FIG. 5, there is shown as a starting point once again a parts program (also called an NC program) which is provided by a CAM system or PP system. In the implementation of this parts program 12 with a milling machine 13, unsatisfactory results will occur if for example a smoothing of the contour were to be carried out one-dimensionally in the processing direction. Cutting path sections lying next to one another would not be recognized in this case and any adjacency relationships would not be evaluated. I.e. to generate the cutting path section or the path, a limited set of future linear sets in the cutting direction would be evaluated (Look-Ahead). This would be done either by pre-specifying the number of the look-ahead sets to be considered or also a geometrical dimension (e.g. for a given speed looking 10 cm ahead along the respective cutting path section). This known erroneous method is now improved in accordance with the invention as follows.

In an analysis step 14 an analysis is undertaken of at least one part of one of the cutting path sections of the path, i.e. of a first cutting path section of the parts program 12. An investigation is made in this analysis as to whether the first cutting path section or a line element or a support point of the same adheres to a tolerance value. Such a tolerance value is for example a distance from a support point on the first cutting path section to a support point on an adjacent, second cutting path section. The tolerance value can however also relate to a distance from the examined support point to a line element of an adjacent cutting path section. Also the tolerance value can relate to an angle between line elements of two adjacent cutting path sections. In general, for the analysis of a cutting path section, not only the support points on this cutting path section, but also path elements of cutting path sections from the surroundings (directly adjacent or also in directly adjacent cutting path elements) are included.

If a predefined tolerance value is now violated, the path is to be optimized in an optimization step 15. In this optimization step 15 the path of the parts program 12 is optimized such that a path element of the first path section is changed, added or removed. In concrete terms for example a support point is added as a path element on an analyzed cutting path section. As a result of the optimized cutting path section and other optimization steps independent thereof for the same and other cutting path sections, an optimized path is produced, which finally is used for the milling machine 13. As will be explained below, the steps 14 and 15 can also be executed in the control of the milling machine 13.

In one form of embodiment the analysis and thus the identification of the aforementioned surface errors can be undertaken by means of a multi-scale analysis with reference to the cutting path sections lying next to one another. The method is then supplemented by an endpoint generation or endpoint discarding on the path section. In this case first of all a number of parallel path sections are assigned to one another. In the next step geometrical differences (distances, angles etc.) between the path sections are established and analyzed. In a last step path elements can now be added or removed.

The method can optionally be used on a PC after the CAD/CAM/PP process as a separate method step on the machine before the workpiece processing or, if the performance of the NC control is sufficient, in real-time operation during the workpiece processing. A semiautomatic process is also conceivable, in which a machine operator is shown that the critical points on a human-machine interface and the machine operator can confirm the repair of said points. Such a method is naturally to be preferred to a re-generation of the entire NC parts program on the CAD/CAM/PP system.

By simultaneously considering approximately parallel path sections a better surface quality is produced without manual post-processing while adhering to the desired surface properties (e.g. angularity).

Figure 2:
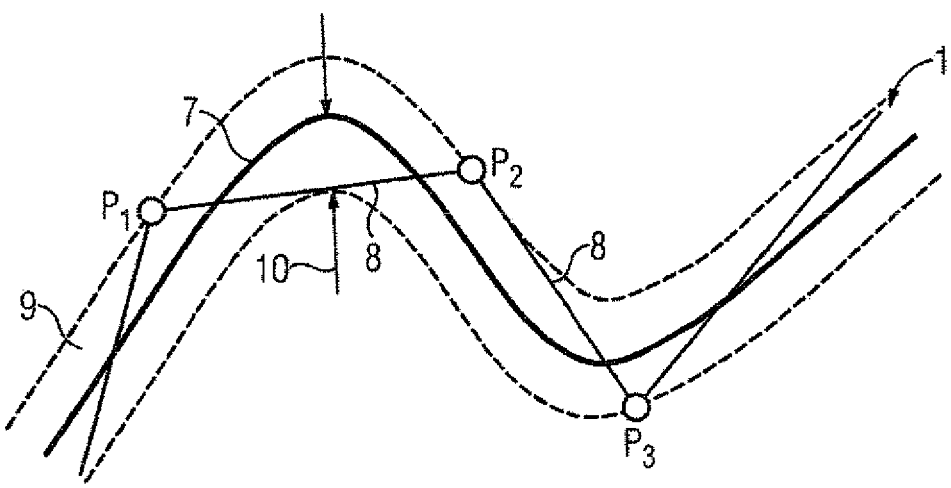
FIG. 2 shows a linearization of an ideal contour path in a predefined tolerance band in accordance with the prior art.
Figure 3:
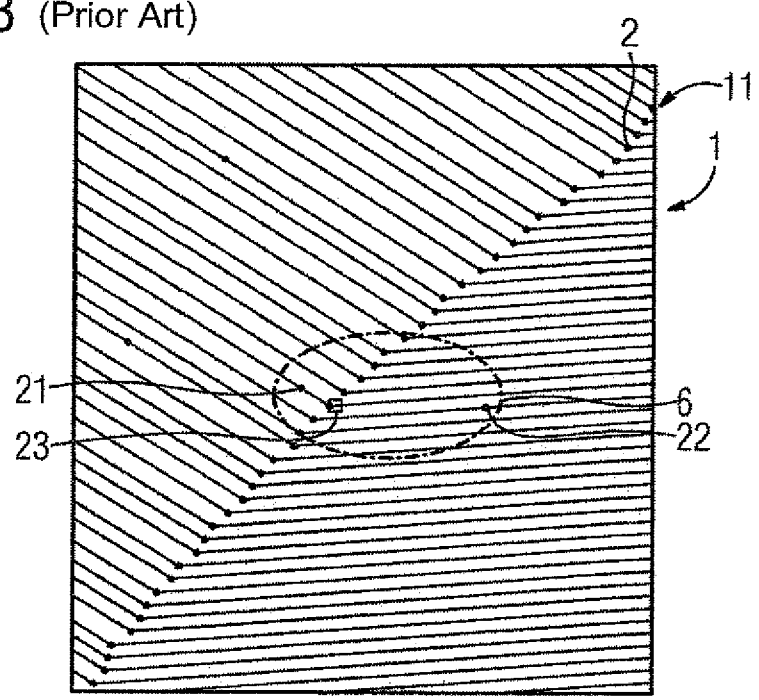
FIG. 3 shows a faulty parts program with an edge.
Figure 4:
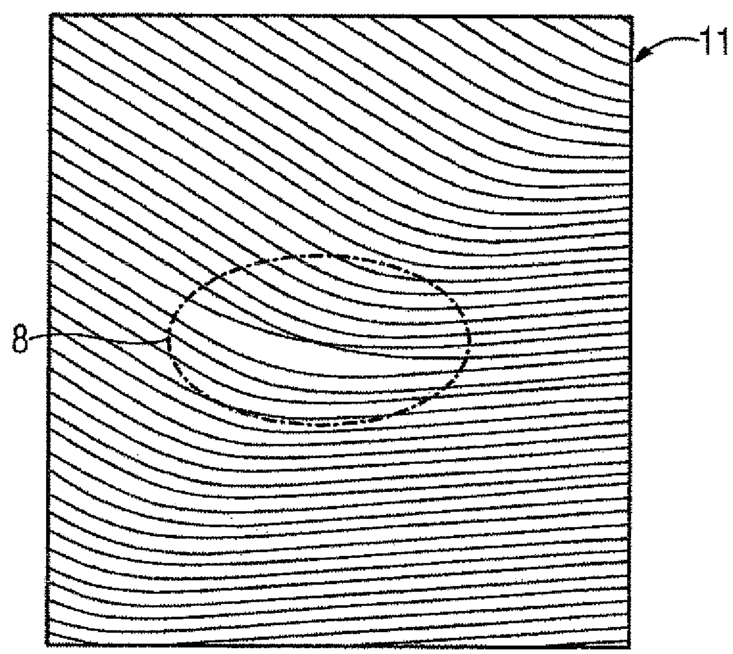
FIG. 4 shows a reaction of an actual NC control to the parts program of FIG. 3.
Figure 6:
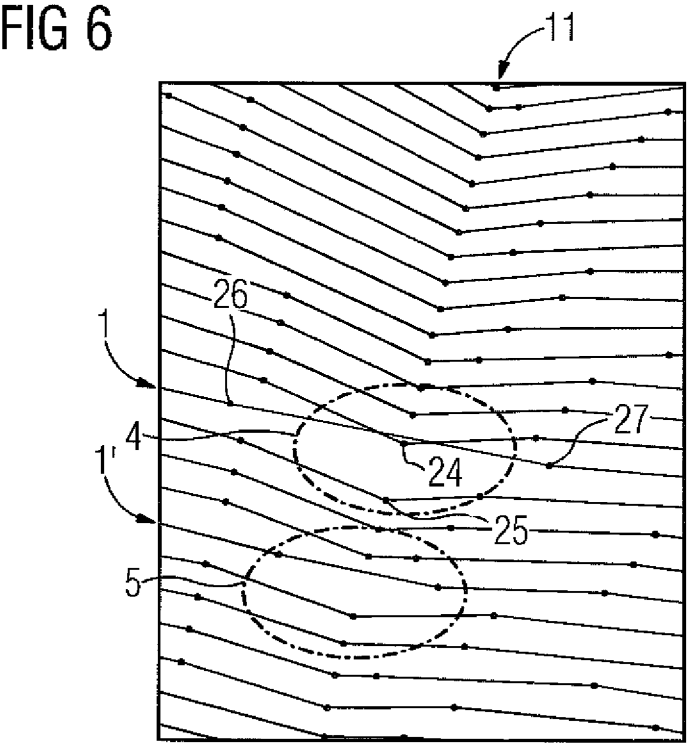
FIG. 6 shows a schematic diagram of a parts program with missing support points.
Figure 7:
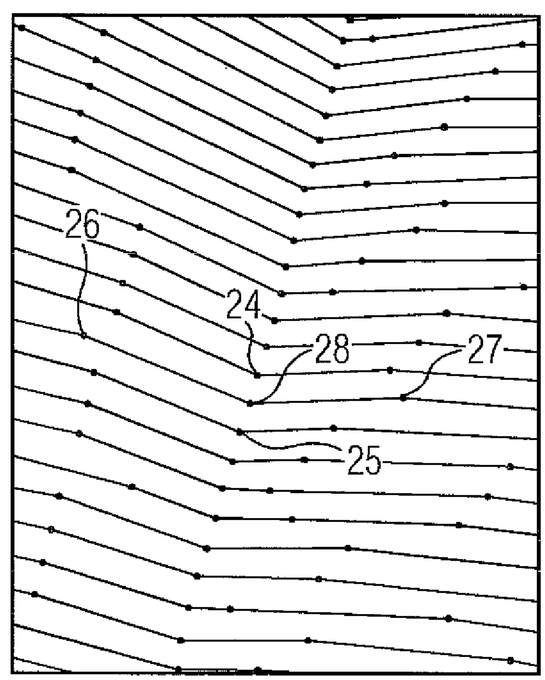
FIG. 7 shows a parts program optimized in relation to FIG. 6.

In a concrete example in accordance with FIGS. 6 and 7 a weak edge, as in the example depicted in FIGS. 3 and 4, is to be created. Unlike in the example shown in said figures, in the parts program here however two error points 4 and 5 are produced which are characterized in that, on the cutting path sections 1 and 1' concerned, a support point is missing on the edge 11 in each case. The edge 11 evidently lies during linearization in the corresponding tolerance band 9 (cf. FIG. 2). Without optimization a corresponding surface error would be produced by this method.

By multi-scale analysis the critical areas (error points 4 and 5) or the cutting path sections 1 and 1' involved are identified. It is now established for example that the distance between the support points on cutting path section 1 at the edge 11 is greater than the distance between the support points on an adjacent cutting path section in the area of the edge 11. If a tolerance value is exceeded in this connection, then an additional support point is inserted. For this purpose information is fetched from an adjacent or a number of adjacent cutting path sections. Specifically it is recognized for example that the support points 24 and 25 are disposed on the directly adjacent, quasi-parallel cutting path sections in the area of the central point between the support points 26 and 27 of the cutting path section 1. These adjacent support points 24 and 25 are then included for generation of a new support point 28 on this cutting path section 1 (cf. FIG. 7). A similar correction can be carried out in respect of the missing support points on cutting path section 1', as is likewise shown in FIG. 7.

In accordance with a further form of embodiment, which will be explained in greater detail with reference to FIGS. 8 and 9, the NC program is likewise prepared by including adjacent information in a somewhat different way. With the power of current controls this preparation can be done in seconds. In such cases the adjacency relationships of support points are determined explicitly and stored in the parts program for example as comments or in the form of a new NC command. In concrete terms a neighbor is explicitly notified to each NC movement command.

Figure 8:
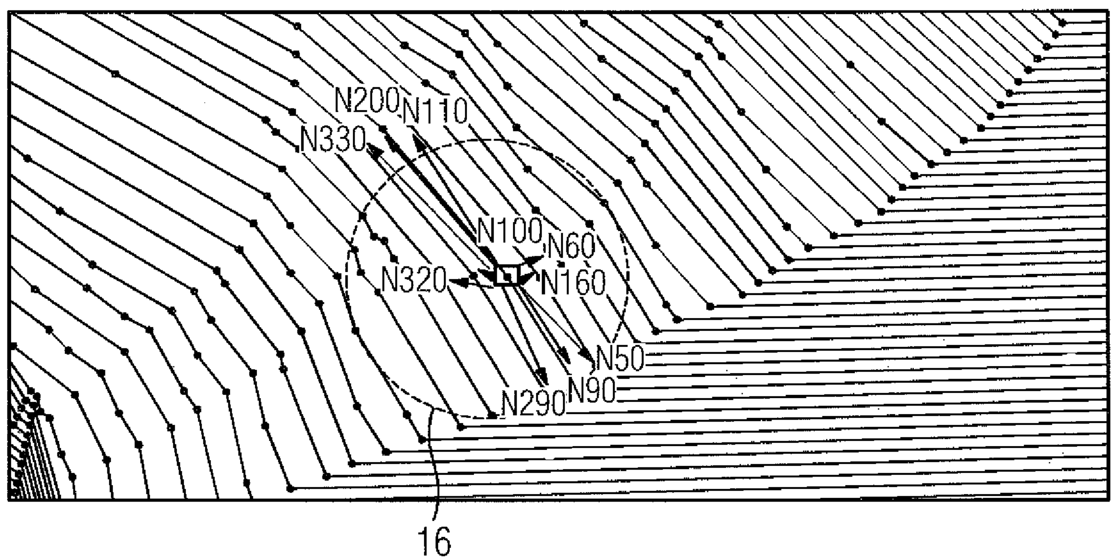
FIG. 8 shows interlinking of a set of support points.
Figure 9:
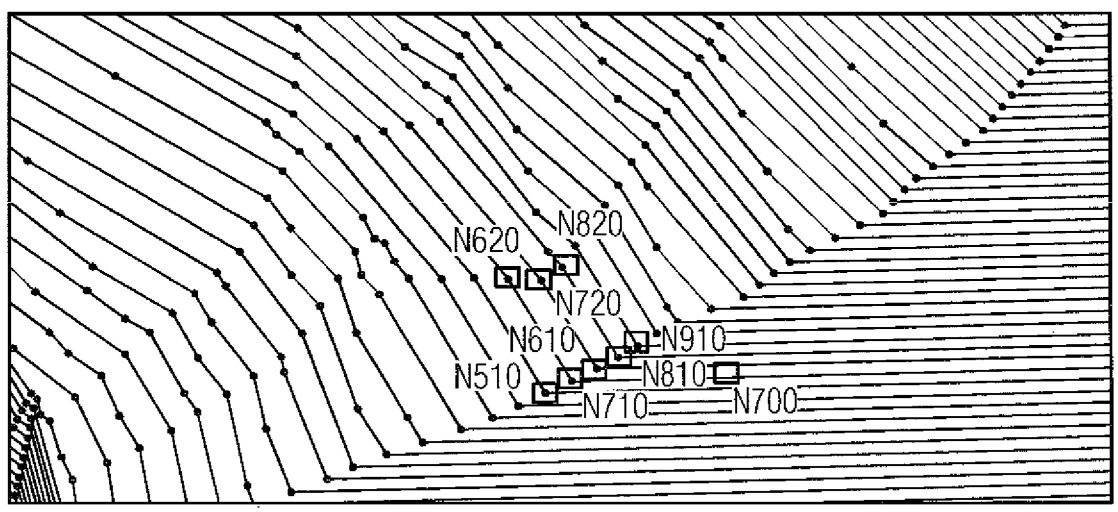
FIG. 9 shows interlinking of support points with additional edge information.

If for example the NC record N100 (cf. FIG. 8) is previously directly connected to its preceding and succeeding NC record N90 and N110 on the cutting path section, then in accordance with this form of embodiment of the invention it is in connection with the NC records in its direct spatial environment, which can likewise be seen from FIG. 8. Each record here describes a concrete support point. In such cases the letter (here "N") describes a concrete range of cutting path sections and the subsequent number describes the respective number of the concrete support point.

In the specific example of FIG. 8 the support point N100 is analyzed. The support point is examined on the basis of all those support points which are disposed within a predefined spatial area. In the case of FIG. 8 the spatial area involves a sphere with the support point N100 as its center. For the optimization of the position of the support point N100 support points within the sphere 16 are now included, optionally also intersections of the sphere with the courses of paths. The number of support points can be further restricted in that only specific cutting path sections, e.g. only two, three, four etc. path sections from the immediate vicinity are included. In addition the number of the support points on the path section further away can be reduced for the consideration through their distance from the support point to be examined (here N100). In the example of FIG. 8 the support points N50, N60, N90, N160, N290 and N320 are then included for the analysis of support point N100. The support points N110, N200 and N330 on the other hand lie outside the sphere 16 and are not taken into consideration. If the sphere 16 or another type of spatial area (cylinder, cube etc.) is selected larger, then these points N110, N200 and N330 might also lie in the area under consideration.

In the parts program the adjacency relationships of the record N100 is notified as follows for example:

1. As a comment:
   N100 X Y Z; N110, N200, N330, N320, N290, N90, N50, N60, N160
2. As an independent NC command "Neighbor":
   N100 X Y Z neighbor (N110, N200, N330, N320, N290, N90, N50, N60, N160)

In this case X, Y and Z refers to the respective coordinate values in the three different spatial directions.

If the NC control is powerful enough, the determination of the neighbors can be carried out not in an upstream computation but at program run time. As an alternative the CAM system can already determine the spatial adjacency relationships and transfer them in the NC program. In this case it is conceivable not only to transfer the neighbors but also additional information for the said design of contour elements. Thus for example in accordance with FIG. 9 a hard edge 11 can be defined by an NC command "Edge". A neighbor relationship could then be defined as follows:

N 710 X Y Z neighbor (N620, N720, N820, N700) edge (N510, N610, N810, N910).

Similar additional information can also relate to corners and other geometrical locations, lines and surfaces. In accordance with the invention spatial information is thus evaluated for grinding a cutting path section instead of just grinding along the cutting path section without taking account of neighboring relationships. For this purpose the neighboring relationship is established explicitly preferably by the NC control within the framework of pre-processing. If necessary intermediate points are created by the NC control to enable the local neighboring relationships to be evaluated within a two-dimensional or three-dimensional tolerance band. Preferably the neighboring relationships are already established in CAM and are merely processed in the NC control. In such cases, as well as the neighboring relationships, contour elements (e.g. edges) are also transferred and taken into consideration if necessary.

The advantage of the present invention especially lies in the perceptible increase in processing accuracy for CAM-generated programs with simultaneous increase of independence from qualification of the CAM programmer and the quality of the CAM program.

If sufficient support points are not located within the selected circular or spherical tolerance area, then intermediate points on the neighboring paths can also be created and inserted automatically by the control or the computer.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed is:

1. A method for controlling a metal-cutting machine tool with a parts program integrated on a Computer Aided Design/Computer Aided Manufacturing/Post Processor (CAD/CAM/PP) system, comprising:

describing with the parts program a path composed of a plurality of adjacent cutting path sections representing a 3D contour; with each cutting path section comprising a series of path elements composed of support points and line elements connecting respective pairs of the support points;

defining a tolerance value;

analyzing at least a part of one of the cutting path sections in the parts program as to whether the defined tolerance value is satisfied in relation to a plurality of path elements of a plurality of neighboring cutting path sections adjacent to the one of the cutting path sections being analyzed;

separately examining a plurality or each of the support points in the parts program of the first one of the cutting path sections being analyzed by taking into account all neighboring support points located in a predefined spatial region around the support point to be examined, wherein the predefined spatial region is a sphere having a center point located at the support point to be examined;

optimizing a course of the path in the parts program by modifying, adding to or removing from the first one of the cutting path sections being analyzed at least one path element so that the defined tolerance value is satisfied; and controlling the metal-cutting machine in accordance with the optimized course of the path in the parts program in real-time operation during a workpiece processing.

2. The method of claim 1, further comprising:

before analyzing, automatically adding an additional support point on at least one line element in the predefined spatial region around the support point to be examined, when a number of the support points or a distance between the support points in the predefined spatial region is less than a predefined numerical value.

3. The method of claim 1, wherein the defined tolerance value relates to a distance or an angle between the first cutting path section and a second cutting path section or to a combination thereof.

4. The method of claim 1, wherein, during optimizing the course of the path, a distance between two neighboring support points is selected to be smaller than a predefined first minimum distance value.

5. The method of claim 4, and further comprising repeating optimizing the course of the path until a predefined distance value is smaller than the predefined first minimum distance value.

6. The method of claim 1, and further comprising, during optimizing the course of the path, using additional geometrical information that is independent of the path elements.

7. The method of claim 1, wherein analyzing and optimizing is performed at least in part while the metal-cutting machine tool is controlled.

8. A control facility for controlling a metal-cutting machine tool, comprising:

a storage device storing a parts program integrated on a Computer Aided Design/Computer Aided Manufacturing/Post Processor (CAD/CAM/PP) system for controlling the metal-cutting machine tool, wherein the parts program describes a path composed of a plurality of adjacent cutting path sections representing a 3D contour; with each cutting path section comprising a series of path elements composed of support points and line elements connecting respective pairs of the support points, a computing device configured to:

optimize a course of the path of the parts program by analyzing at least a part of one of the of the cutting path sections as to whether a defined tolerance value is satisfied in relation to a plurality of path elements of a plurality of neighboring cutting path section adjacent to the one of the cutting path sections being analyzed, separately examine a plurality or each of the support points in the parts program of the one of the cutting path sections being analyzed by taking into account all neighboring support points located in a predefined spatial region around the support point to be examined, wherein the predefined spatial region is a sphere having a center point located at the support point to be examined, and optimize a course of the path in the parts program by modifying, adding to or removing from the one of the cutting path sections being analyzed at least one path element so that the defined tolerance value is satisfied, and an activation device configured to control the metal-cutting machine tool in accordance with the optimized course of the path in the parts program in real-time operation.

* * * * *